(12) United States Patent
Hirt et al.

(10) Patent No.: US 11,831,269 B2
(45) Date of Patent: Nov. 28, 2023

(54) METHOD FOR CONTROLLING TWO ELECTRIC MOTORS

(71) Applicant: ebm-papst St. Georgen GmbH & Co. KG, St. Georgen (DE)

(72) Inventors: Markus Hirt, Villingen-Schwennigen (DE); Frank Jeske, St. Georgen (DE); Jörg Hornberger, Dornstetten-Aach (DE); Manfred Bitzer, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 598 days.

(21) Appl. No.: 17/051,286

(22) PCT Filed: Sep. 9, 2019

(86) PCT No.: PCT/EP2019/073922
§ 371 (c)(1),
(2) Date: Oct. 28, 2020

(87) PCT Pub. No.: WO2020/083555
PCT Pub. Date: Apr. 30, 2020

(65) Prior Publication Data
US 2021/0050805 A1    Feb. 18, 2021

(30) Foreign Application Priority Data
Oct. 25, 2018  (DE) .......................... 102018126701.0

(51) Int. Cl.
*H02P 5/753* (2006.01)
*B60W 60/00* (2020.01)
(Continued)

(52) U.S. Cl.
CPC ............. *H02P 5/753* (2013.01); *B60W 10/08* (2013.01); *B60W 10/119* (2013.01);
(Continued)

(58) Field of Classification Search
CPC .... H02P 5/753; H02P 1/00; H02P 1/18; H02P 1/24; H02P 1/26; H02P 1/42; H02P 1/46;
(Continued)

(56) References Cited

U.S. PATENT DOCUMENTS

| 6,491,127 | B1 | 12/2002 | Holmberg et al. |
| 2001/0008985 | A1 | 7/2001 | Wada |

(Continued)

FOREIGN PATENT DOCUMENTS

| CN | 102458962 A | 5/2012 |
| DE | 202008004190 U1 | 7/2008 |
| DE | 102016007445 A1 | 12/2017 |

OTHER PUBLICATIONS

International Search Report dated Nov. 14, 2019.
(Continued)

*Primary Examiner* — Antony M Paul
(74) *Attorney, Agent, or Firm* — Dickinson Wright PLLC

(57) ABSTRACT

The disclosure relates to a method for controlling a first electric motor (M1) and a second electric motor (M2) of a wheel drive module, wherein the wheel drive module comprises a wheel (R) and a speed modulation gearbox (G), and wherein the wheel (R) is drivable about a wheel axis (A) jointly by the first and the second electric motors (M1, M2) by means of the speed modulation gearbox (G) and steerable about a steering axis (L) which is orthogonal to the wheel axis (A), wherein electrical control signals for controlling the first and second electric motors (M1, M2) are determined from wheel reference values which characterize the driving and/or the steering of the wheel (R).

9 Claims, 1 Drawing Sheet

(51) Int. Cl.
*B60W 10/08* (2006.01)
*B60W 10/119* (2012.01)
*B60W 10/20* (2006.01)

(52) U.S. Cl.
CPC ............ *B60W 10/20* (2013.01); *B60W 60/00* (2020.02); *B60W 2510/081* (2013.01); *B60W 2510/083* (2013.01); *B60W 2510/1005* (2013.01); *B60W 2510/20* (2013.01)

(58) Field of Classification Search
CPC .... H02P 1/465; H02P 1/54; H02P 5/00; H02P 5/60; H02P 5/68; H02P 5/695; H02P 6/00; H02P 6/005; H02P 6/04; H02P 6/08; H02P 6/32; H02P 27/00; H02P 27/04; H02P 27/06; H02P 27/08; B60W 10/08; B60W 10/119; B60W 2510/20; B60W 2510/081; B60W 2510/1005; B60W 60/00
See application file for complete search history.

(56) References Cited

U.S. PATENT DOCUMENTS

2005/0108998 A1* 5/2005 Hunt ................... A01D 34/008
56/6
2015/0096823 A1 4/2015 Raymond

OTHER PUBLICATIONS

Chinese Office Action dated Mar. 7, 2022.
European Office Action dated Jan. 3, 2023.
Li, Chunshan, et al., "Fault-Tolerant Control for 4WID/4WIS Electric Vehicle Based on EKF and SMC," SAE International, Sep. 29, 2015.
Potluri, Ramprasad, "Path-Tracking Control of an Autonomous 4WS4WD Electric Vehicle Using Its Natural Feedback Loops," IEEE Transactions on Control Systems Technology, vol. 23, No. 5, Sep. 2015.
Dai, Penglei, et al., "Force Control of a 4WS4WD Vehicle for Path Tracking," IEEE International Conference on Advanced Intelligent Mechatronics (AIM), Jul. 7-11, 2015.

* cited by examiner

METHOD FOR CONTROLLING TWO ELECTRIC MOTORS

RELATED APPLICATIONS

This application claims priority to PCT/EP2019/073922, filed Sep. 9, 2019, and German Patent Application No. 10 2018 126 701.0, filed Oct. 25, 2018, the entire contents of which are incorporated herein by reference in their entirety.

FIELD

The disclosure relates to a method for controlling a first and a second electric motor by which a wheel is rotated or driven jointly by means of a speed modulation gearbox about a wheel axis and is steerable about a steering axis.

BACKGROUND

In the prior art, a plurality of methods for controlling an electric motor or for driving or for steering a wheel is already known. However, usually a wheel is driven only by a single electric motor and steered by another single electric motor. As a result, the electric motors, by means of which the respective function is provided, can be controlled separately from one another. If the driving function of a wheel and the steering function are each jointly provided by two or more electric motors, the electric motors cannot be controlled separately from one another.

The wheel with the associated speed modulation gearbox and with the electric motors which drive and steer the wheel can be combined to form a wheel drive module, wherein an application such as, for example, a transport carriage and in particular a driverless transport vehicle as part of a driverless transport system, comprises four wheel drive modules, for example. Here it is particularly problematic that the application at the same time must control two motors per wheel drive module and that the associated computation load and the data quantities to be transmitted between the wheel drive modules and a central control are correspondingly large.

If the wheel drive modules used differ from one another and comprise, for example, different performance data or if they implement the steering and driving functions differently, the central control in each case must be adapted to the wheel drive modules used.

BRIEF SUMMARY

The present disclosure overcomes the aforementioned disadvantages and provides a method for controlling two electric motors which jointly drive and steer a wheel by input signals relating to the wheel.

This is achieved by the combination of features according to claim 1.

According to the disclosure, a method for controlling a first electric motor and second electric motor of a wheel drive module is proposed. In addition to the first and the second electric motor, the wheel drive module comprises a wheel and a speed modulation gearbox, wherein the wheel is drivable about a wheel axis jointly by the first and the second electric motors by means of the speed modulation gearbox and steerable about a steering axis which is orthogonal to the wheel axis. In the method according to the disclosure, from wheel reference values which characterize the driving and/or steering of the wheel, electrical control signals for controlling the first and second electric motors are determined.

If an application such as a driverless transport vehicle comprises, for example, four wheel drive modules, the application or a control of the application does not have to take into consideration the particular design of its individual wheel drive modules or their performance data. The application control transmits to the respective drive modules only the wheel reference values which, adapted to the respective wheel drive module, are then converted by the method for controlling the two electric motors into control signals for controlling the electric motors.

Preferably, the wheel reference values are a pair of values which comprise a steering angle of the wheel and a rotational speed of the wheel. In particular, these values can therefore be a pair consisting of a wheel reference angle and a wheel reference rotational speed or of a wheel reference speed and a wheel reference torque.

An advantageous embodiment variant moreover provides that the wheel reference values are determined from a path to be traveled by the wheel or by the wheel drive module and from a speed of the wheel or of the wheel drive module along the path, wherein the path takes into consideration the distance to be traveled and the course of the road.

In an advantageous method variant, for controlling the motors, it is provided that, from the control signals for the first and second electric motors, by a respective motor control associated with the first or the second electric motor, a motor reference rotational speed, a motor reference position or a motor reference torque is determined or derived, and the respective electric motor is controlled by the respective motor control in order to achieve the motor reference rotational speed, the motor reference position or the motor reference torque.

The motor reference rotational speed of the respective electric motor is preferably determined from a first motor reference rotational speed for achieving a driving speed and from a second motor reference rotational speed for achieving a steering angle. Thus, for the motor reference rotational speeds of the first electric motor (motor reference rotational speed$_{M1}$):

motor reference rotational speed$_{M1}(t)$=motor reference rotational speed$_{Driving}(t)$+motor reference rotational speed$_{Steering}(t)$ The motor reference rotational speed for the first motor thus results from the addition of the motor reference rotational speed for the driving and the motor reference rotational speed for the steering.

Here the motor reference rotational speed$_{Driving}$ is the component of the motor reference rotational speed$_{M1}$ that is necessary for achieving the predetermined speed of the wheel or of the wheel drive module, and the motor reference rotational speed$_{Steering}$ is the component of the motor reference rotational speed$_{M1}$ that is necessary for setting the predetermined steering angle of the wheel.

If the driving and steering load is distributed over the first and second electric motors, the following is true analogously for that of the motor reference rotational speeds of the second electric motor (motor reference rotational speed$_{M2}$):

motor reference rotational speed$_{M2}(t)$=motor reference rotational speed$_{Driving}(t)$+motor reference rotational speed$_{Steering}(t)$ The motor reference rotational speed for the second motor thus results from the subtraction of the motor reference rotational speed for the steering from the motor reference rotational speed for the driving.

An advantageous variant moreover provides that the gear ratio of the first and the second electric motors via the speed modulation gearbox to the wheel is identical. Thereby, the motor reference rotational speed for achieving a driving speed for the first and the second electric motors at an identical gear ratio of the speed modulation gearbox for the first and second electric motors is identical. In particular, the motor reference rotational speed for the driving is determined from a wheel reference rotational speed of the wheel and the gear ratio of the speed modulation gearbox, so that:

motor reference rotational speed$_{Driving}(t)$=wheel reference rotational speed($t$)·gear ratio$_{Driving}$ The motor reference rotational speed for the driving thus results from the multiplication of the wheel reference rotational speed by the gear ratio for the driving.

The motor reference rotational speed for achieving the steering angle for the second electric motor, at an identical gear ratio of the speed modulation gearbox for the first and second electric motors, in case of an identical distribution of the steering to be carried out, is the negative value of the motor reference rotational speed for achieving the steering angle for the first electric motor. Depending on the transmission of the electric motors or an installation direction of the electric motors, values of the motor reference rotational speeds can also be identical and not negative with respect to one another, wherein the drive gear rings of the speed modulation gearbox driven by the electric motors, in the case of a pure steering movement without driving movement in synchronization and in the case of a driving movement with simultaneous steering movement in counter-rotation, move with a rotational speed differential. The motor reference rotational speed for achieving the steering angle for the first electric motor is determined from a change of the wheel steering angle of the wheel about the steering axis, so that:

$$\begin{aligned}\text{motor reference} \\ \text{rotational } speed_{Steering}(t)\end{aligned} = \text{motor reference rotational } speedM1_{Steering}(t)$$

$$= -\text{motor reference rotational } speed_{M2Steering}(t)$$

$$= d \text{ wheel steering angle}(t) \cdot$$

$$\text{gear } ratio_{Steering} \cdot (2\pi \cdot TA)^{-1}$$

Here, the motor reference rotational speed$_{Steering}$ is in each case determined in SI units, that is to say in rotations per second.

That the motor reference rotational speed for steering the second motor corresponds to the negative motor reference rotational speed for steering for the first motor applies particularly in the case of a pure steering movement without driving movement. Otherwise, the motor reference rotational speed for steering is preferably added to the motor reference rotational speed for the driving or subtracted therefrom in order to achieve a rotational speed differential on the drive gear rings of the speed modulation gearbox.

Here, an advantageous variant moreover provides that the change of the wheel steering angle results from an actual wheel steering angle (wheel steering angle$_{Actual}$) and a predetermined wheel steering angle (wheel steering angle$_{Reference}$) as follows:

$d$ wheel steering angle($t$)=wheel steering angle$_{Reference}(t+TA)$−wheel steering angle$_{Actual}(t)$ The value $T_A$ here corresponds to the call interval and is, for example, 1 ms, wherein the change of the wheel steering angle is determined in rad. In addition, it is provided that the actual wheel steering angle results from the positions of the motors and the gear ratio, wherein the positions of the motors or the motor positions are absolute positions, which were determined by a multiturn sensor or which are determined directly on the respective motor. Here:

wheel steering angle$_{Actual}(t)$=(motor position$_{M1}(t)$−motor position$_{M2}(t)$)·(2·gear ratio$_{Steering}$).

Here, as motor position, in particular the absolute rotation angle of the drive shafts of the motors in rad is determined based on a starting position.

An additional aspect of the disclosure relates to the wheel drive module. Said wheel drive module comprises the wheel, the speed modulation gearbox as well as the first electric motor and the second electric motor, which are controlled by the method according to any one of the preceding claims. The first and the second electric motors are designed to drive the wheel jointly by means of the speed modulation gearbox about a wheel axis and to steer it about a steering axis which is orthogonal to the wheel axis. Furthermore, the wheel drive module comprises a first motor electronics unit for controlling the first electric motor and a second motor electronics unit for controlling the second electric motor as well as a central electronics unit which is connected to the first and second motor electronics units so as to enable a signal exchange. In order to control the first and second electric motors for driving the wheel about the wheel axis and to steer the wheel about the steering axis, the wheel drive module comprises a control logic. In order to be able to flexibly adapt the control of the electric motors to the respective electric motors used, it is provided that the control logic is provided by the first and second motor electronics units, the central electronics unit, an application electronics unit, which is connected to the central electronics unit so as to enable a signal exchange, or which is provided jointly by the central electronics unit and the first and second motor electronics units. The control logic here is designed to receive wheel reference values from a higher-level control, for example, from a control of the application, and to determine, from the wheel reference values, the electrical control signals for the first and second electric motors and to transmit the control signals to the first and/or second electric motor(s).

In order to be able to service and individualize the wheel drive module rapidly and cost effectively, it is moreover advantageous if the wheel drive module is subdivided into additional subassemblies which can be exchanged as a modular unit. For example, the central electronics unit can form a central subassembly, and, along with the respective associated first or second motor control, the first and second electric motors can form a respective first or second motor subassembly.

Moreover, by means of the wheel drive module, state information of the wheel and/or of the electric motors is preferably transferred to the higher-level application. In order to verify that the transferred state information is in fact the correct state information and not incorrect state information due, for example, to a defective sensor, information sources such as, for examples, sensors, can be present redundantly. The state information provided by the sensors and actuators can be converted by a safety logic and compared to one another, in order to validate the plausibility and verify the state information and in order to transfer such plausibility-validated or actual state information items to the higher-level application or to the control logic for controlling the electric motors.

BRIEF DESCRIPTION OF THE DRAWINGS

Other advantageous developments of the disclosure are characterized in the dependent claims and represented in further detail below together with the description of the preferred design of the disclosure in reference to the figures. In the figures:

The figures are diagrammatic examples. Identical reference numerals in the figures refer to identical functional and/or structural features.

DETAILED DESCRIPTION

Figure 1:
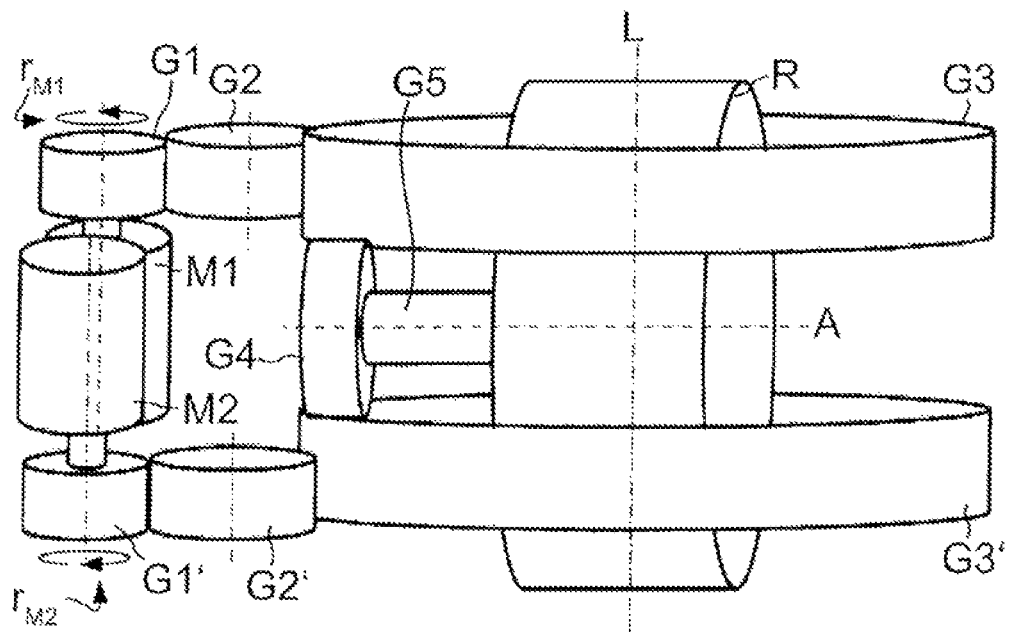
FIG. 1 shows a wheel driven by a first and a second electric motor by means of a speed modulation gearbox.

In FIG. 1, the wheel R, the first and second electric motors M1, M2 as well as the speed modulation gearbox G for driving and steering the wheel R by means of the two electric motors M1, M2 are represented. Here, by FIG. 1, only one possible design alternative of the drive of the wheel R about the wheel axis A and the steering axis L by the first and second electric motors M1, M2 is illustrated. For example, the wheel R can be arranged under the drive gear rings G3, G3', or the electric motors M1, M2 can comprise another transmission to the drive gear rings G3, G3' as well as another orientation. In the represented example, the speed modulation gearbox G comprises the pinions G1, G1', the intermediate wheels G2, G2', the drive gear rings G3, G3' as well as the output gearwheel G4 and the output shaft G5. In addition, in other embodiment variants, the speed modulation gearbox G can also comprise additional components.

The first and the second electric motors M1, M2 drive the first and the second drive gear rings G3, G3'. In the embodiment shown, the first electric motor M1 is arranged opposite the second electric motor M2, wherein the electric motors M1, M2 can each comprise a separate motor transmission. The electric motors M1, M2 are in each case connected via a motor shaft to a respective pinion G1, G1'.

The first pinion G1 engages by means of its toothing in a toothing of a first intermediate gear G2 which engages by means of its toothing in a drive toothing of the first drive gear ring G3, so that, due to a rotation of the first pinion G1, the first drive gear ring G3, driven by the first electric motor M1, can be rotated about the rotation axis or steering axis L.

Analogously, the same applies to the second drive gear ring G3'. The second pinion G1' engages by means of its toothing in a toothing of a second intermediate gear G2' which engages by means of its toothing in a drive toothing of the second drive gear ring G3', whereby, by a rotation of the second pinion G1', the second drive gear ring G3', driven by the second electric motor M2, can be rotated about the rotation axis or steering axis L.

Between the first and the second drive gear rings G3, G3', an output gearwheel G4 is arranged, which engages by means of its toothing both in a toothing of the first drive gear ring G3 facing the output gearwheel G4 and also in a toothing of the second drive gear ring G3' facing the output gearwheel G4. The rotation of the output gearwheel G4 (third rotation) is consequently brought about by the rotation of the first drive gear ring G3 (first rotation) and also by the rotation of the second drive gear ring G3' (second rotation).

From the output gearwheel G4, an output shaft G5 connected in a rotationally fixed manner to the output gearwheel G4 extends along a wheel axis A in the direction of the rotation axis or the steering axis L of the drive gear rings G3, G3'. On a side spaced from the output gearwheel G4 along the wheel axis A, the wheel R is connected in a rotationally fixed manner to the output shaft G5, whereby a rotation (third rotation) of the output gearwheel G4 is transmitted via the output shaft G5 to the wheel R. As represented in sections, the wheel R is accommodated between the first drive gear ring G3 and the second drive gear ring G3', which are spaced apart along the rotation axis L thereof and define a wheel accommodation space between them. Both drive gear rings G3, G3' comprise a ring opening extending along the rotation axis L through the respective drive gear ring G3, G3'. The wheel R extends at least on the side thereof which faces the bottom through the respective ring opening, whereby the wheel R substantially comprises five sections. A first section by means of which the wheel R is arranged between the drive gear rings, two second sections by means of which the wheel R is arranged in the ring openings of the drive gear rings G3, G3', and two third sections by means of which the wheel R lies along the rotation axis L outside of the drive gear rings G3, G3'. The arrangement of the wheel R in the wheel accommodation space leads to three advantageous effects. The installation space of the wheel drive module is clearly reduced, since the wheel R, in a steering movement, does not need to rotate around the drive gear rings G3, G3', and the possible steering angle is increased, since the wheel R can be rotated 360° in the drive gear rings G3, G3' without the steering movement or rotation about the rotation axis L being limited by the intermediate gears G2, G2'. In addition, the wheel R is protected by the wheel drive module 1 or by the first and second drive gear rings G3, G3' since they form a cage around the wheel R.

The rotation direction of the first motor rM1 and the rotation direction of the second motor rm2, drawn in FIG. 1, are oriented with respect to one another such that the drive gear rings G3, G3' in a pure driving movement perform a counter-rotation with respect to one another and as a result the wheel R is not rotated about the steering axis L.

Figure 2:
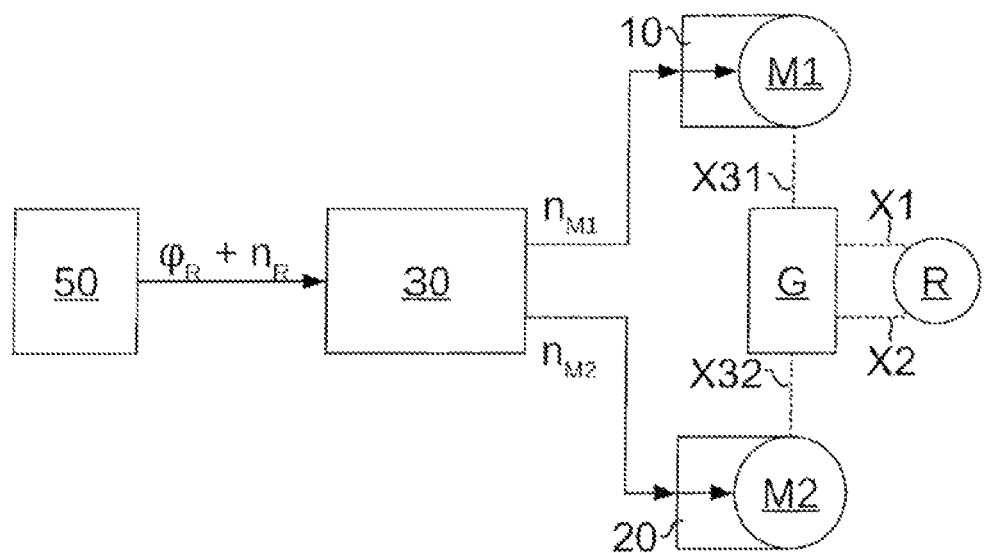
FIG. 2 shows a diagrammatic representation of an implementation of the method for controlling a first and a second electric motor by a central electronics unit of the wheel drive module.

In FIG. 2, a portion of the wheel drive module is represented diagrammatically. By the drive of the wheel R about the steering axis L and the wheel axis A, a driving function X2 and a steering function X1 are provided on or by the wheel R. For the provision of the steering and driving function X1, X2 by means of the speed modulation gearbox G, said speed modulation gearbox is driven by the first and second electric motors M1, M2 by means of the first and second operative connection X31, X32.

In an application case such as in the field of logistics, for example a transport carriage, the respective application comprises at least two and preferably four wheel drive modules. Thus, eight motors for driving and for steering the transport carriage have to be controlled by the control of such a transport carriage.

In order to relieve the control of the transport carriage, it is therefore provided in the embodiment variant shown that the control 50 of the transport carriage transmits to each of its wheel drive modules the respective wheel reference steering angle $\varphi_R$ of the wheel R as well as the wheel reference rotational speed $n_R$ of the wheel R, for example, via a bus line.

Here it is also advantageous that, for the control 50 of the application or the transport carriage, it is not important how the electric motors M1, M2 are controlled and whether only one electric motor contributes to the steering and only one electric motor contributes to the driving or whether both electric motors M1, M2 contribute to driving and steering.

In the represented diagrammatic representation, the method for controlling the first and second electric motors M1, M2 is implemented by the central electronics unit 30. The input values, respectively the wheel reference steering angle $\varphi_R$ and the wheel reference rotational speed $n_R$, are transmitted to the central electronics unit 30 and converted into a motor reference rotational speed of the first electric motor M1 (motor reference rotational speed$_{M1}$) or $n_{M1}$, as well as into a motor reference rotational speed of the second electric motor M2 (motor reference rotational speed$_{M2}$) or $n_{M2}$. The two motor reference rotational speeds nM1 and nM2 are transferred from the central electronics unit 30 to the respective motor electronics unit 10, 20 and the respective electric motor M1, M2 is controlled in order to achieve the respective motor reference rotational speed $n_{M1}$, $n_{M2}$ by them.

The invention claimed is:

1. A method for controlling a first electric motor (M1) and a second electric motor (M2) of a wheel drive module, wherein the wheel drive module comprises a wheel (R) and a speed modulation gearbox (G), and wherein the wheel (R) is drivable about a wheel axis (A) jointly by the first and the second electric motors (M1, M2) by means of the speed modulation gearbox (G) and steerable about a steering axis (L) which is orthogonal to the wheel axis (A), wherein
electrical control signals for controlling the first and second electric motors (M1, M2) are determined from wheel reference values which characterize the driving and/or the steering of the wheel (R).

2. The method according to claim 1, wherein
the wheel reference values are a wheel reference angle and a wheel reference rotational speed or a wheel reference speed or a wheel reference torque.

3. The method according to claim 2, wherein
the wheel reference values are determined from a path to be traveled by the wheel (R) or by the wheel drive module and a speed of the wheel (R) or of the wheel drive module along the path, wherein the path takes into consideration the distance to be traveled and the course of the road.

4. The method according to claim 1, wherein,
from the control signals for the first and second electric motors (M1, M2), by a respective motor control associated with the first or with the second electric motor (M1, M2), a motor reference rotational speed, a motor reference position or a motor reference torque is determined, and the respective electric motor (M1, M2) is controlled in order to achieve the motor reference rotational speed, the motor reference position or the motor reference torque.

5. The method according to claim 4, wherein
the motor reference rotational speed of the respective electric motor (M1, M2) is determined from a first motor reference rotational speed for achieving a driving speed and from a second motor reference rotational speed for achieving a steering angle, so that:

motor reference rotational speed$_{M1}$(t)=motor reference rotational speed$_{Driving}$(t)motor +reference rotational speed$_{Steering}$(t) and motor reference rotational speed$_{M2}$(t)=motor reference rotational speed$_{Driving}$(t)−motor reference rotational speed$_{Steering}$(t).

6. The method according to claim 5, wherein the motor reference rotational speed for achieving a driving speed for the first and the second electric motors (M1, M2) at an identical gear ratio of the speed modulation gearbox (G) for the first and second electric motors (M1, M2) is identical and is determined in particular from a wheel reference rotational speed of the wheel (R) and the gear ratio of the speed modulation gearbox (G), so that:

motor reference rotational speed$_{Driving}$(t)=reference rotational speed(t)·gear ratio$_{Driving}$ 7. The method according to claim 5, wherein
the motor reference rotational speed for achieving the steering angle for the second electric motor (M2), at identical gear ratio of the speed modulation gearbox (G) for the first and second electric motors (M1, M2), is the negative value of the motor reference rotational speed for achieving the steering angle for the first electric motor (M1), and the motor reference rotational speed for achieving the steering angle for the first electric motor (M1) is determined from a change of the wheel steering angle of the wheel (R) about the steering axis (L), so that:

motor reference rotational speed$_{Steering}$(t)=motor reference rotational speedM1$_{Steering}$(t)=−motor reference rotational speed$_{M2Steering}$(t)=d wheel steering angle(t)·gear ratio$_{Steering}$·(2π·TA$^{-1}$)

8. The method according to the preceding claim 7, wherein
the change of the wheel steering angle is obtained as follows:

d wheel steering angle(t)=wheel steering angle$_{Reference}$(t+TA)·wheel steering angle$_{Actual}$(t) with TA as call interval and wherein wheel steering angle$_{Actual}$(t)=(motor position$_{M1}$(t)−motor position$_{M2}$(t))(2·gear ratio$_{Steering}$).

9. A wheel drive module comprising the wheel (R), the speed modulation gearbox (G) as well as the first electric motor (M1) and the second electric motor (M2), which are controlled by the method according to claim 1, wherein
the first and the second electric motors (M1, M2) are designed to drive the wheel (R) jointly by means of the speed modulation gearbox (G) about a wheel axis (A) and to steer it about a steering axis (L) which is orthogonal to the wheel axis (A),
the wheel drive module comprises a first motor electronics unit for controlling the first electric motor (M1) and a second motor electronics unit for controlling the second electric motor (M2) as well as a central electronics unit which is connected so as to enable a signal exchange with the first and second motor electronics units, and wherein
the drive wheel module comprises a control logic for controlling the first and second electric motors (M1, M2) for driving the wheel (R) about the wheel axis (A) and for steering the wheel (R) about the steering axis (L), which is provided by the first and second motor electronics units, the central electronics unit, an application electronics unit, which is connected to the central electronics unit so as to enable a signal exchange, or which is provided jointly by central electronics unit and the first and second motor electronics units, wherein
the control logic is designed to determine, from the wheel reference values, the electrical control signals for the first and second electric motors (M1, M2) and to transmit the control signals to the first and/or second electric motors (M1, M2).

* * * * *